(12) United States Patent
Tanikawa et al.

(10) Patent No.: US 7,081,067 B2
(45) Date of Patent: Jul. 25, 2006

(54) PLANETARY GEAR STRUCTURE

(75) Inventors: Naoya Tanikawa, Nagoya (JP); Koichi Sakamoto, Kariya (JP); Yuichi Kitasako, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 132 days.

(21) Appl. No.: 10/808,408

(22) Filed: Mar. 25, 2004

(65) Prior Publication Data

US 2004/0192492 A1    Sep. 30, 2004

(30) Foreign Application Priority Data

Mar. 28, 2003  (JP) ............... 2003-090914

(51) Int. Cl.
*F16H 57/08* (2006.01)
(52) U.S. Cl. ................... 475/331; 475/346
(58) Field of Classification Search ........... 475/334, 475/346, 348, 331, 114, 116
See application file for complete search history.

(56) References Cited

U.S. PATENT DOCUMENTS

| 3,376,761 | A | * | 4/1968 | Stepputtis | 475/346 |
| 4,901,601 | A | * | 2/1990 | Leggat | 475/348 |
| 4,901,602 | A | * | 2/1990 | Matoba | 475/335 |
| 6,440,033 | B1 | * | 8/2002 | Suhling et al. | 475/331 |

FOREIGN PATENT DOCUMENTS

JP        2508622       6/1996

* cited by examiner

*Primary Examiner*—Charles A. Marmor
*Assistant Examiner*—Tara L. Bolton
(74) *Attorney, Agent, or Firm*—Buchanan Ingersoll PC

(57) ABSTRACT

A planetary gear structure includes a carrier, a plurality of pinion shafts each inserted into a bore in the carrier, and a stopper plate arranged between a pair of the pinion shafts to hold the pinion shafts without any revolutions on its own axis.

17 Claims, 5 Drawing Sheets

US 7,081,067 B2

PLANETARY GEAR STRUCTURE

This application is based on and claims priority under 35 U.S.C. § 119 with respect to Japanese Application No. 2003-090914 filed on Mar. 28, 2003, the entire content of which is incorporated herein by reference.

FIELD OF THE INVENTION

The present invention generally relates to a planetary gear structure. More particularly, the present invention pertains to a stopper plate of a planetary gear structure for holding pinion shafts.

BACKGROUND OF THE INVENTION

An example of a known planetary gear structure is disclosed in Japanese Utility Model No. 2508622. This known planetary gear structure is constructed to fit a plurality of pinion shafts within a carrier.

FIGS. 4–7 illustrate an example of a known planetary gear structure 11 which is adapted to be assembled within a transmission. The planetary gear structure 11 includes a single stopper plate 106 which holds six pinion shafts 101 within a carrier 100. Each of the pinion shafts 101 has a slit 103 so as to engage with the stopper plate 106. The stopper plate 106 has three projecting portions 107, each of which is arranged on the outer circumference of the stopper plate 106 so that adjacent projecting portions 107 are spaced apart from one another at equal angular intervals. Each of the projecting portions 107 is engaged with a bore 108 of the carrier 100 as shown in FIG. 6 for fixing the stopper plate 106 against rotation after assembly. Here, the carrier 100 is attached to a housing 12 of the transmission.

To fix the pinion shafts 101 with the carrier 100, each of the pinion shafts 101 is inserted into a respective receiving bore. Then, the stopper plate 106 is rotationally positioned so that the stopper plate 106 is near the predetermined pinion shafts 101. This condition is shown by the broken line position in FIG. 5. Further, the stopper plate 106 is rotated in the counter-clockwise direction so that the slit 103 of each pinion shaft 101 engages or receives a portion of the stopper plate 106. This condition is shown by the solid line position in FIG. 5. At that time, the projecting portions 107 are also engaged with the carrier 100.

A purpose of the pinion shafts 101 is not only to rotatably support the pinions, but also to lubricate the oil-supplying passages 4, 5. The lubricating oil is supplied to a bearing supporting the pinions, engagement portions between the pinion and a sun gear, engagement portions between the pinion and a ring gear, and engagement portions between the pinions. Therefore, the purpose of the stopper plate 106 for holding pinion shafts 101 is not only to fix the pinion shafts 101 to the carrier 100, but also to prevent the pinion shafts from rotating on their respective axes and allow the openings of the oil-supplying passages to be appropriately positioned.

However, with the planetary gear structure 11 shown in FIGS. 4–7, because all of the pinion shafts 101 are fixed to the carrier 100 by way of the single stopper plate 106, it is necessary that the position arrangements of the pinion shafts 101 be simultaneously done. Thus, the assembling time of the pinion shafts 101 is relatively long and the working thereof is somewhat troublesome. Further, because the stopper plate 106 is formed as a single piece, the fabrication of the stopper plate 106 can be relatively complicated.

SUMMARY OF THE INVENTION

According to one aspect, a planetary gear structure provided in a vehicle transmission comprises a carrier possessing a plurality of circumferentially spaced apart bores, a plurality of pinion shafts each adapted to receive a pinion gear, and at least three stopper plates. Each of the pinion shafts is positioned in one of the bores in the carrier so that the pinion shafts are circumferentially spaced apart from one another. The stopper plates are separate and spaced apart from one another, and are positioned between adjoining pairs of the pinion shafts. Each of the stopper plates engages two different ones of the pinion shafts to rotationally fix the pinion shafts against rotation relative to the carrier.

According to another aspect, a planetary gear structure comprises a carrier provided with a plurality of circumferentially spaced apart bores, a plurality of pinion shafts and a plurality of stopper plates. Each of the pinion shafts is adapted to receive a pinion gear and is positioned in one of the bores in the carrier so that the pinion shafts are circumferentially spaced apart from one another. The pinion shafts are each provided with a slit. The stopper plates are separate from one another and arranged between adjoining pairs of the pinion shafts. Each of the stopper plates engages the slit in two of the pinion shafts to fix the pinion shafts against rotation relative to the carrier.

In accordance with another aspect, a planetary gear structure comprises a carrier having a cylindrical portion, a plurality of pinion shafts mounted in the carrier along an axial direction of the cylindrical portion, and a stopper plate arranged between a pair of the pinion shafts so as to fix each of the pinion shafts against revolution about its own respective axis.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIG. 1 is an elevational view of one embodiment of the disclosed planetary gear structure according to the present invention.

FIG. 2 a cross-sectional view of the planetary gear structure taken along the section line II—II in FIG. 1.

Figures 5, 6:
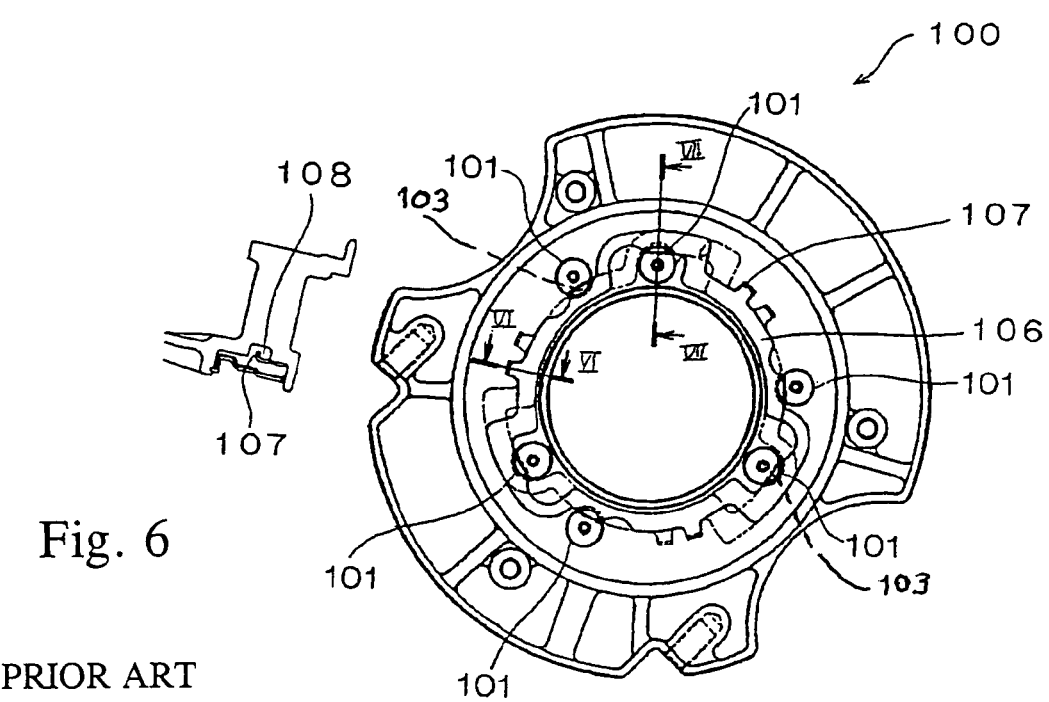
FIG. 5 is an elevational view of the planetary gear structure shown in FIG. 4.
FIG. 6 is a cross-sectional view of the planetary gear structure shown in FIG. 5 taken along the section line VI—VI in FIG. 5.
Figure 7:
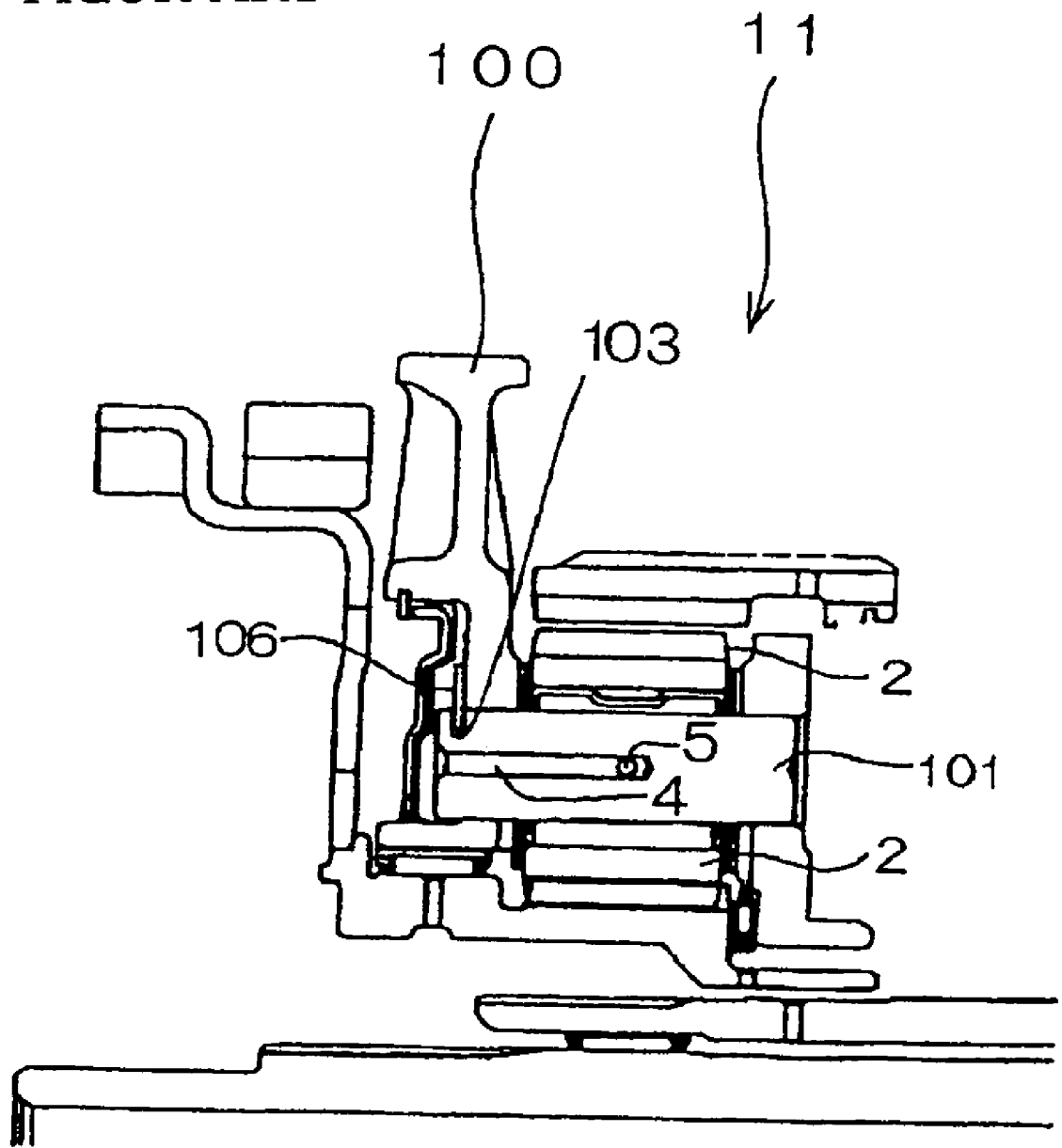

FIG. 7 a cross-sectional view of the planetary gear structure shown in FIG. 5 taken along the section line VII—VII in FIG. 5.

DETAILED DESCRIPTION

Figures 1, 2:
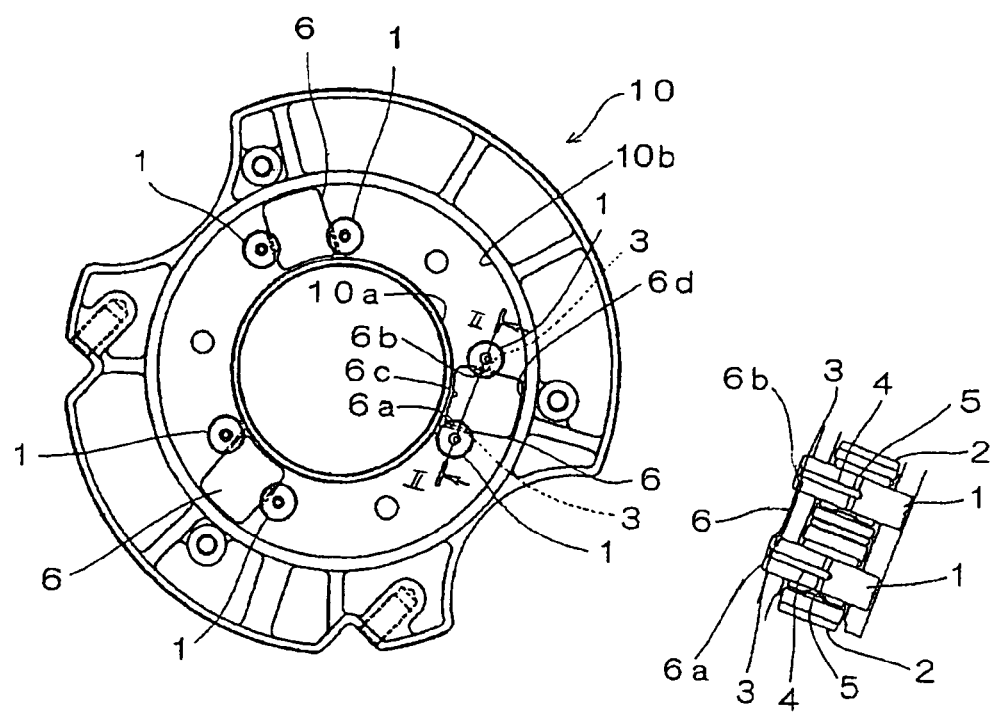

FIGS. 1 and 2 illustrate one version of the disclosed planetary gear structure according to the present invention. This disclosed version is a double-pinion type of planetary gear structure which can be used in a vehicle transmission.

As shown in FIG. 1, the planetary gear structure generally comprises a carrier 10, six pinion shafts 1 and three stopper plates 6. The carrier 10 possesses an inner circumferential wall 10a and an outer circumferential wall 10b. The outer circumferential wall 10b is formed in the shape of a cylindrical portion within the carrier 10. Both the pinion shafts 1 and the stopper plates 6 are located between the inner circumferential wall 10a and the outer circumferential wall 10b.

Each of the stopper plates 6 is arranged between a respective pair of adjacent pinion shafts 1 as shown in FIG. 1. Each of the stopper plates 6 possesses two side portions 6a, 6b positioned at oppositely located portions of the plate. Both side portions 6a, 6b extend along the radial direction of the cylindrical portion. Each of the stopper plates 6 also possesses an inner end portion 6c and an outer end portion 6d. Once again, these inner and outer end portions are positioned at oppositely located portions of the plate. The stopper plates 6 can be positioned and dimensioned so that the inner end portion 6c contacts the inner circumferential wall 10a of the carrier 10 while the outer end portion 6d contacts the outer circumferential wall 10b when the stopper plates 6 are inserted into the carrier 10.

The planetary gear structure also comprises a plurality of pinions 2. Each of the pinions 2 is rotatably supported by a respective one of the pinion shafts 1. Each of the pinion shafts 1 has a slit 3 that faces the respective stopper plates. Further, each of the pinion shafts 1 has oil passages 4, 5. The oil passage 4 extends in the axial direction of the pinion shaft 1 while the oil passage 5 extends in the radial direction of the pinion shaft. Each of the pinion shafts 1 is assembled and adjusted so that openings of the oil passages 4, 5 face a specified portion where lubricating oil is necessary, for example the engagement portion between the pinion 2 and a sun gear or the engagement portion between the pinion 2 and a ring gear.

The assembly of the pinion shafts 1 into the carrier 10 with the stopper plate 6 can be carried out as follows. At first, the side portion 6a of one of the stopper plates 6 is inserted into the slit 3 of one of the pinion shafts 1, and the opposite side portion 6b of that stopper plate 6 is inserted into the slit 3 of another one of the pinion shafts 1 to form a sub-assembly. Each of the other two stopper plates 6 is similarly inserted into the slits 3 of another pair of pinion shafts 1 to produce two other sub-assemblies. Each of the resulting sub-assemblies, in which the stopper plate 6 is sandwiched by two pinion shafts 1, is arranged into the carrier 10. That is, the two pinion shafts 1 of each respective sandwiched sub-assembly are inserted into respective bores in the carrier. When the stopper plates 6 are dimensioned in the manner described above, the inner end portion 6c of each stopper plate 6 contacts the inner circumferential wall 10a of the carrier 10 while the outer end portion 6d of each stopper plate 6 contacts the outer circumferential wall 10a of the carrier 10. In this way, the stopper plates 6 are sandwiched between the circumferential walls 10a, 10b and are thus arranged within the carrier 10. In the illustrated embodiment, the pairs of pinion shafts forming a sub-assembly are spaced apart at equal angular intervals as shown in FIG. 1.

According to this embodiment, each of the stopper plates 6 holds a pair of pinion shafts 1 for fixing the pinion shafts against rotation about their respective axes and relative to the carrier. Because the carrier 10 comprises three stopper plates 6, a total of six pinion shafts 1 can be appropriately positioned relative to the carrier 10 by the stopper plates 6. Further, because each of the stopper plates 6 is supported by a pair of the pinion shafts 1 and the circumferential walls 10a, 10b of the carrier 10, each of the stopper plates 6 cannot readily move in either the radial direction of the cylindrical portion of the carrier 10 or in the peripheral direction thereof. Thus, the arrangement of the stopper plates 6 is well-balanced. Therefore, compared to the known planetary gear structure described above, the assembly of the pinion shafts 1 and the plates 6 is easier and the assembly time is shortened. Further, as the shape and size of the plates 6 is relatively simple and small, the weight of the planetary gear system is reduced as is the cost associated with forming the plates 6.

Figure 3:
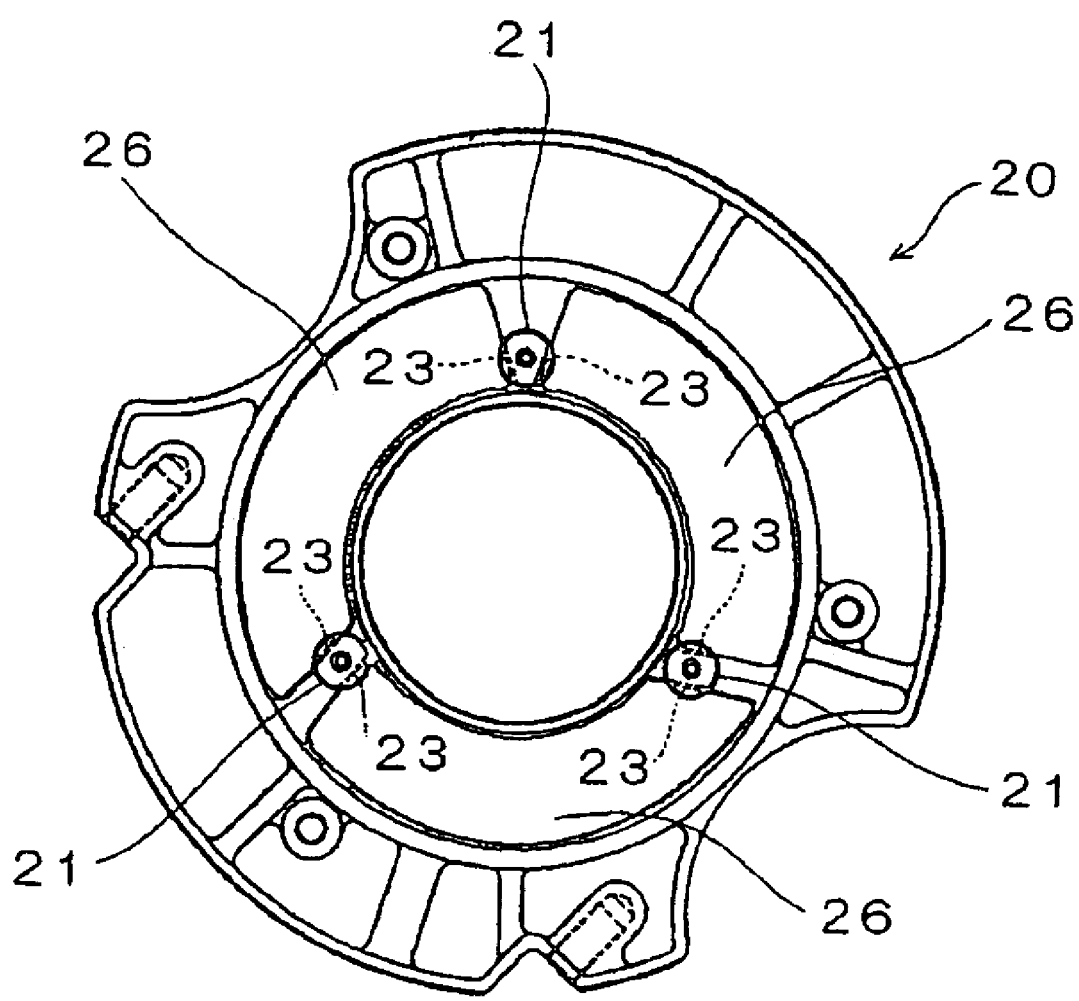
FIG. 3 is an elevational view of another embodiment of the disclosed planetary gear structure according to the present invention.
Figure 4:
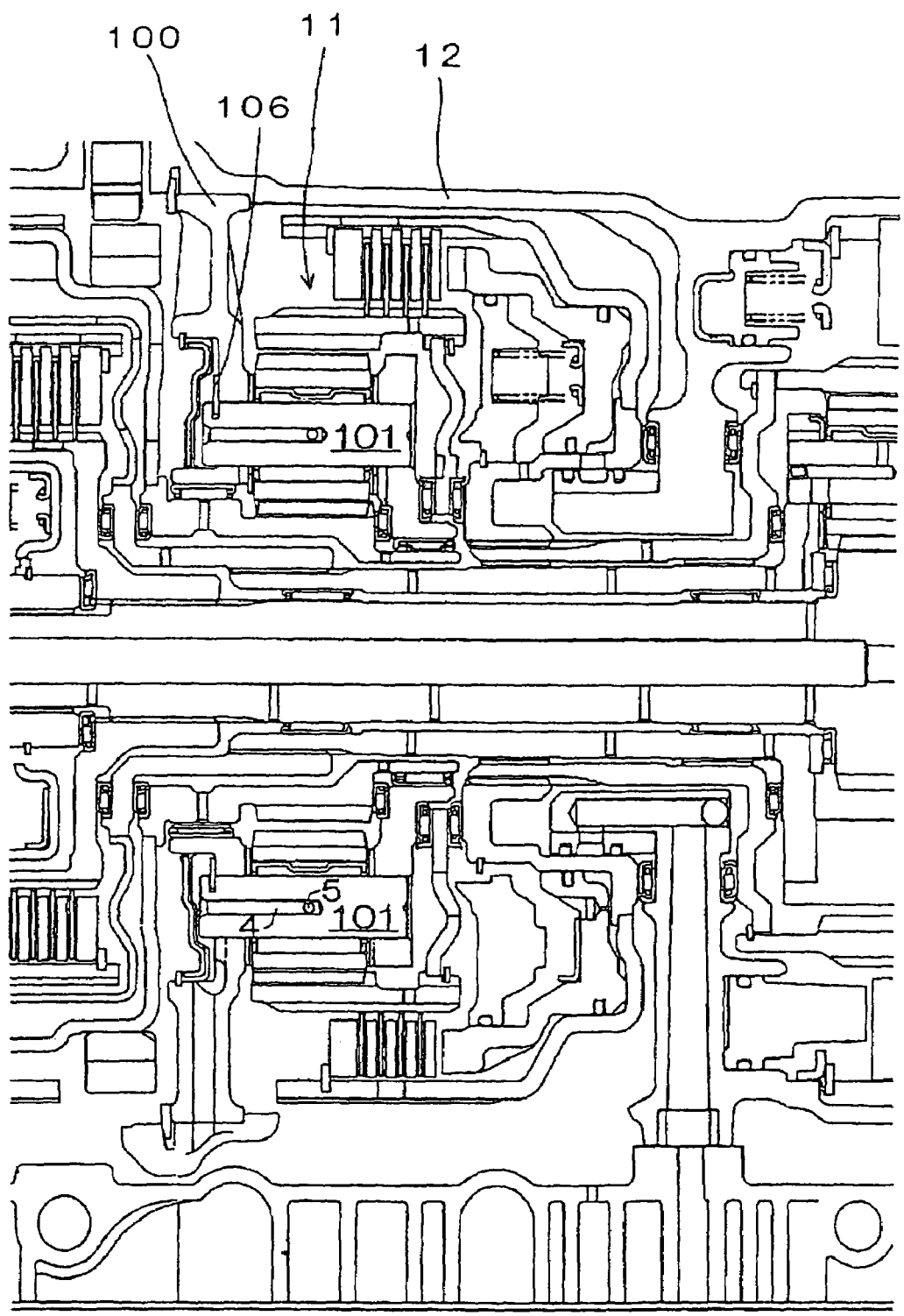
FIG. 4 is a cross-sectional view of a transmission with a known planetary gear structure.

FIG. 3 illustrates another version of the disclosed planetary gear structure according to the present invention. This planetary gear structure is a single-pinion type of planetary gear structure which can be used in a vehicle transmission. As shown in FIG. 3, a carrier 20 has a cylindrical portion. Three pinion shafts 21 are arranged at equal angular intervals relative to one another and are located within the cylindrical portion. Each of the pinion shafts 21 has a pair of slits 23, 23, positioned so that the pinion shafts, viewed from the end, are symmetrical about a plane extending along the length of the shaft and extending midway between the two slits. The planetary gear structure also includes three stopper plates 26, with each stopper plate being arcuate in shape and extending over a portion of the circumferential extent of the carrier. Each stopper plate 26 is arranged between two adjoining pinion shafts 21. More specifically, one side portion of each stopper plate 26 is positioned in the slit 23 of one pinion shaft 21 while the opposite side portion of each stopper plate 26 is positioned in the slit 23 in the adjoining pinion shaft 21.

The assembly of this version of the disclosed planetary gear structure involves positioning each of the stopper plates between two adjacent pinion shafts, thus forming a sub-assembly with three pinion shafts and three stopper plates. This sub-assembly can then be assembled to the carrier by inserting the pinion shafts in the respective bores of the carrier.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A planetary gear structure provided in a vehicle transmission comprising:
    a carrier possessing a plurality of circumferentially spaced apart bores;
    a plurality of pinion shafts each adapted to receive a pinion gear, each of the pinion shafts being positioned in one of the bores in the carrier so that the pinion shafts are circumferentially spaced apart from one another; and
    at least three stopper plates separate and spaced apart from one another, each of the stopper plates being positioned between adjoining pairs of the pinion shafts, each of the stopper plates engaging two different ones of the pinion shafts to rotationally fix the pinion shafts against rotation relative to the carrier.

2. The planetary gear structure according to claim 1, further comprising a slit provided in an outer surface of each of the pinion shafts, each stopper plate engaging the slit in two different pinion shafts.

3. The planetary gear structure according to claim 1, wherein the stopper plates possesses oppositely positioned side portions which each engage one of the pinion shafts.

4. A planetary gear structure comprising:
a carrier provided with a plurality of circumferentially spaced apart bores;
a plurality of pinion shafts each adapted to receive a pinion gear, each of the pinion shafts being positioned in one of the bores in the carrier so that the pinion shafts are circumferentially spaced apart from one another, each of the pinion shafts being provided with a slit; and
a plurality of separate stopper plates each arranged between adjoining pairs of the pinion shafts and each engaging the slit in two of the pinion shafts to fix the pinion shafts against rotation relative to the carrier.

5. The planetary gear structure according to claim 4, wherein each pinion shaft is engaged by only a single one of the stopper plates.

6. The planetary gear structure according to claim 4, wherein each pinion shaft is engaged by two of the stopper plates.

7. The planetary gear structure according to claim 4, wherein each stopper plate has a pair of side portions extending in a radial direction of the carrier, each of the side portions of each stopper plate engaging the slit in one of the pinion shafts.

8. The planetary gear structure according to claim 7, wherein each stopper plate has an inner end portion and an outer end portion, the inner end portion of each plate engaging an inner circumferential wall of the carrier and the outer end portion of each stopper plate engaging an outer circumferential wall of the carrier.

9. The planetary gear structure according to claim 4, wherein the plurality of pinion shafts comprises more than three pinion shafts.

10. The planetary gear structure according to claim 9, wherein the plurality of stopper plates is no more than three stopper plates.

11. The planetary gear structure according to claim 4, wherein the plurality of pinion shafts is no more than three pinion shafts.

12. The planetary gear structure according to claim 11, wherein the plurality of stopper plates is no more than three stopper plates.

13. A planetary gear structure comprising:
a carrier having a cylindrical portion:
a plurality of pinion shafts mounted in the carrier along an axial direction of the cylindrical portion; and
a stopper plate arranged between a pair of the pinion shafts so as to fix each of the pinion shafts against revolution about its own respective axis, wherein the stopper plate has a pair of side portions, each of which extends along a radial direction of the cylindrical portion and each of which engages one of the am ion shafts, wherein the pinion shafts have a slit on an outer surface for receiving one of the side portions of the stopper plate;
wherein the stopper plate has an inner end portion and an outer end portion, the inner end portion of the stopper plate engaging an inner circumferential wall of the carrier and the outer end portion engaging an outer circumferential wall of the carrier.

14. The planetary gear structure according to claim 13, further comprising a plurality of stopper plates, each pinion shaft being engaged by only a single one of the stopper plates.

15. The planetary gear structure according to claim 13, further comprising a plurality of stopper plates, each pinion shaft being engaged by two of the stopper plates.

16. The planetary gear structure according to claim 13, further comprising a plurality of stopper plates, the plurality of pinion shafts comprising more than three pinion shafts.

17. The planetary gear structure according to claim 13, further comprising a plurality of stopper plates, the plurality of pinion shafts being no more than three pinion shafts.

* * * * *